United States Patent [19]

Esaki

[11] Patent Number: 5,132,964
[45] Date of Patent: Jul. 21, 1992

[54] PACKET COMMUNICATION EXCHANGE INCLUDING DUMMY PACKET TRANSMISSION

[75] Inventor: Hiroshi Esaki, Kanagawa, Japan

[73] Assignee: Kabushiki Kaisha Toshiba, Kawasaki, Japan

[21] Appl. No.: 580,912

[22] Filed: Sep. 12, 1990

Related U.S. Application Data

[63] Continuation-in-part of Ser. No. 324,725, Mar. 17, 1989, Pat. No. 4,970,720.

[30] Foreign Application Priority Data

Mar. 17, 1988 [JP] Japan .................................. 63-61868
Jun. 30, 1988 [JP] Japan .................................. 63-160871

[51] Int. Cl.$^5$ ............................................... H04J 3/26
[52] U.S. Cl. ....................................... 370/60; 370/94.1
[58] Field of Search ..................... 340/60, 85.2, 94.1

[56] References Cited

U.S. PATENT DOCUMENTS 4,970,720  11/1990  Esaki ................................... 370/94.1

Primary Examiner—Douglas W. Olms
Assistant Examiner—Melvin Marcelo
Attorney, Agent, or Firm—Foley & Lardner

[57] ABSTRACT

A packet communication exchanging apparatus includes: a common communication channel through which a plurality of data packets are communicated; a plurality of input modules coupled to the common communication channel, for receiving the data packets and transferring the data packets to the communication channel; and, a plurality of output modules coupled to the common communication channel, for temporarily storing the data packets sent from the input modules via the communication channel, and for generating and sending a dummy packet to the communication channel when the amount of the data packets temporarily stored therein exceeds a predetermined threshold value, whereby the input module detects a packet contention occurring on the communication channel due to the dummy packet supplied thereto so as to control the data packet transmission from the input module to the communication channel.

9 Claims, 13 Drawing Sheets

PACKET COMMUNICATION EXCHANGE INCLUDING DUMMY PACKET TRANSMISSION

This is a continuation-in-part application of application Ser. No. 07/324,725, filed Mar. 17, 1989, now U.S. Pat. No. 4,970,720.

BACKGROUND OF THE INVENTION

1. Field of the Invention

The present invention generally relates to a load controlling system used in a packet communication exchange. More specifically, the invention is directed to a load controlling method employed in a packet communication exchange, capable of accessing a data bus with high efficiency.

2. Description of the Related Art

In a known packet transmission exchange, data packets are transmitted and/or received between a plurality of modules connected to a common communication medium, for instance, a data bus. When a data packet transmission demand for the common communication medium causes contention disputes, contention control is carried out so as to apply a transmission right to a specific module among those modules where the packet contention disputes occur. Also, another packet contention controlling method has been proposed, in consideration of an equality, where such a transmission right is not applied eccentrically to a specific module.

The above-described conventional contention controls of the packet communication system are known from, e.g., Japanese Laid-open (KOKAI) patent application No. 59-200554 (1984) corresponding to U.S. patent application Ser. No. 485034 filed on Apr. 13, 1984 in the U.S.A. by Anthony Acampora, entitled "Network Protocol For Integrating Synchronous and Asynchronous Traffic On A Common Serial Data Bus," now U.S. Pat. No. 5,040,170.

In accordance with these conventional packet contention controlling systems, the packet transmission delays occurring between the modules employed in the packet communication exchange can be controlled. However, another packet transmission delay occurring in the buffer circuit employed in the module is rather more serious than the above-described delays caused in the modules, because of the major reason for the delay. This buffer circuit is used for packets waiting for packet transmission to the trunk line. This packet transmission delay in the buffer circuit is particularly emphasized in such a case as when the packets are temporarily concentrated in the module corresponding to the specific trunk line, which are sent from the communication medium in the pocket communication exchange capable of possessing extremely higher throughput than the data transmission speed in the trunk line. This delay tendency is increased even more when the traffic owns the burst characteristics. In the specific condition, the data packets to be sent may overflow the buffer circuit. As a consequence, the packets which have overflowed the buffer circuit may be discarded during packet communication.

As previously described, the above-described conventional bus accessing type packet communication exchanges have the following drawbacks. That is, due to the mis-matching in the operation speeds, the amount of the data packets to be transmitted, the operation speed of which is lower than the bus operation speed, temporarily becomes excessive. As a result, these waiting data packets temporarily stored in the buffer circuit may overflow this buffer circuit and thus, the overflowed packets may be discarded during packet communication.

The present invention has been made in an attempt to solve these problems of the conventional packet communication systems, and therefore has an object to provide a load controlling system used in a packet communication exchange, capable of controlling packets which are waiting to be transmitted to a common communication medium without discarding the data packets.

SUMMARY OF THE INVENTION

To achieve the above-described object, a load controlling system used in a packet communication exchange, according to the invention, comprises:

a common communication channel (6) through which a plurality of data packets are communicated;

a plurality of input module means (401-1: 401-N, "N" being an integer) coupled to the common communication channel (6), for receiving the data packets and transferring the data packets to the communication channel (6); and, a plurality of output module means (402-1: 402-M, "M" being an integer) coupled to the common communication channel (6), for temporarily storing the data packets sent from the input module means via the communication channel (6), and for generating and sending a dummy packet to the communication channel (6) when an amount of the data packets temporarily stored therein exceeds a predetermined threshold value (A : B), whereby the input module means detects a packet contention occurring on the communication channel due to the dummy packet supply thereto so as to control the data packet transmission from the input module means to the communication channel.

In the load controlling system used in the pocket communication exchange, according to the invention, the packet transmission and reception by the terminal interface module are controlled by the control unit in accordance with the capacity of the memory employed in the trunk interface module. Then, the probability of excessive packets being continuously input into the trunk interface module can be considerably reduced. As a consequence, there is a very small probability that data packets to be sent to a trunk interface module will wait at a terminal interface module.

A trunk interface module employed with such a system may include a dummy packet generator/transmitter operating in conjunction with a comparator and bus monitor to transmit a dummy packet or it may include a dummy contention unit to supply the dummy packet.

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

Basic Idea

Before proceeding with various types of the packet communication exchange according to the present invention, a basic idea of the packet communication exchange capable of controlling a load condition in accordance with the invention will now be summarized.

A plurality of input modules and output modules are interconnected via a common communication line to each other. A plurality of input/output data lines are connected to the respective input/output modules. Each of the input modules includes a means for monitoring data packet contentions appearing on the communication line, and a means for controlling a data packet transmission to the communications line based upon the results of the monitored packet contention. In the respective output modules, there are employed a means for temporarily storing the data packets received from the communication line; a means for producing a dummy packet control signal by checking a quantity of data packets (i.e., a queue packet length) stored in the storing means; and a means for generating and sending a dummy packet to the communication line in response to the dummy packet control signal. When the queue packet length exceeds a threshold level, the dummy packet control signal is produced. As a result of the dummy packet generation, data packet contentions occur on the communication line, so that the monitor means of the input module detects the occurrence of the data packet contention. Thus, the control means of the input means controls transmission of new data packets to the communication line so as to avoid a further packet contention. As a consequence, the queue packet length of the output module is reduced, so that the data packet's discard due to the overflowed data packets in the storing means can be prevented.

First Bus Accessing Type Packet Communication Exchange

A description will now be made concerning a bus accessing type packet communication exchange 100 employing a load controlling system according to a first preferred embodiment of the invention.

Figure 1:
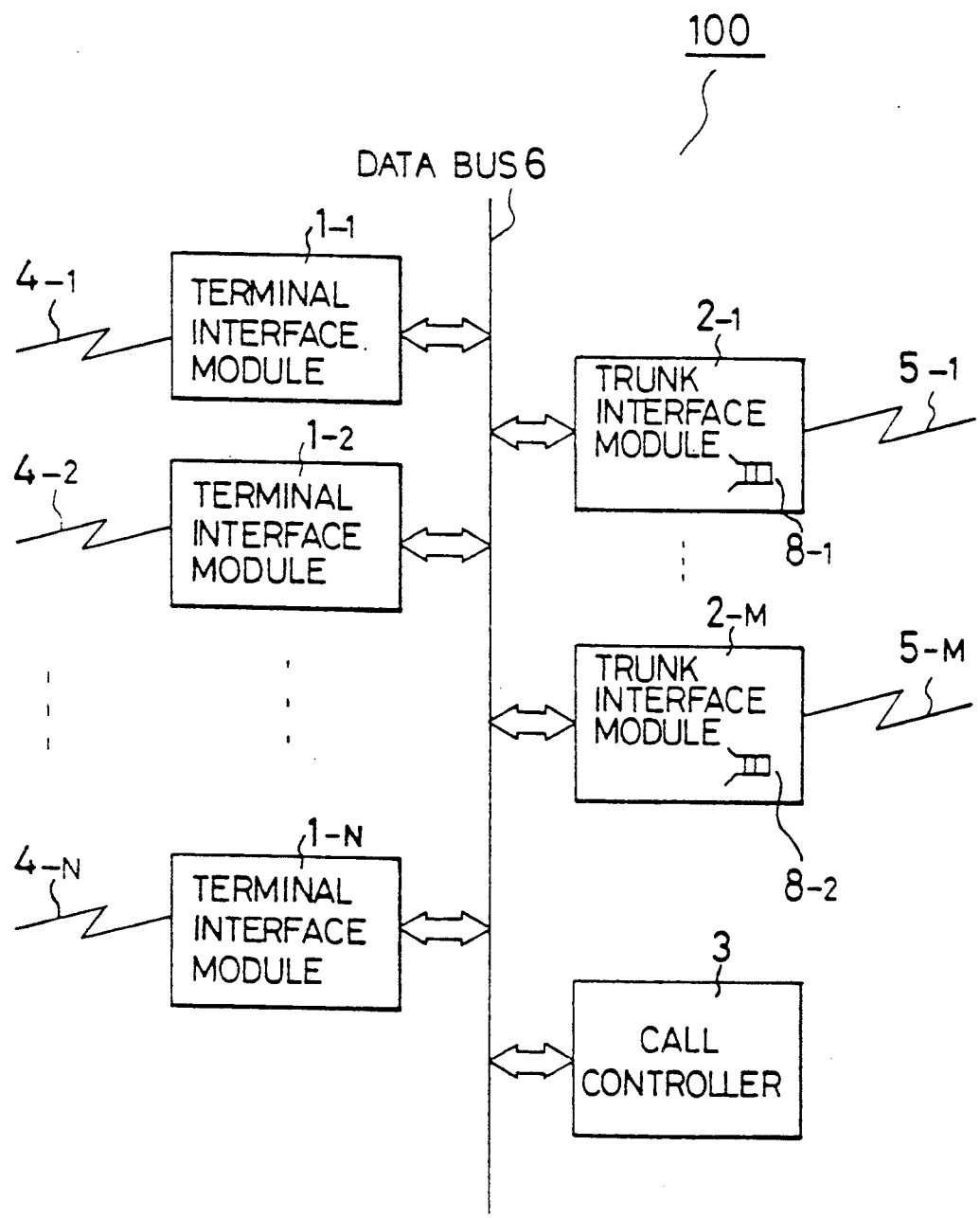
FIG. 1 is a schematic block diagram of a bus accessing type packet communication exchange 100 employing a load controlling system according a first preferred embodiment of the invention.
Figure 2:
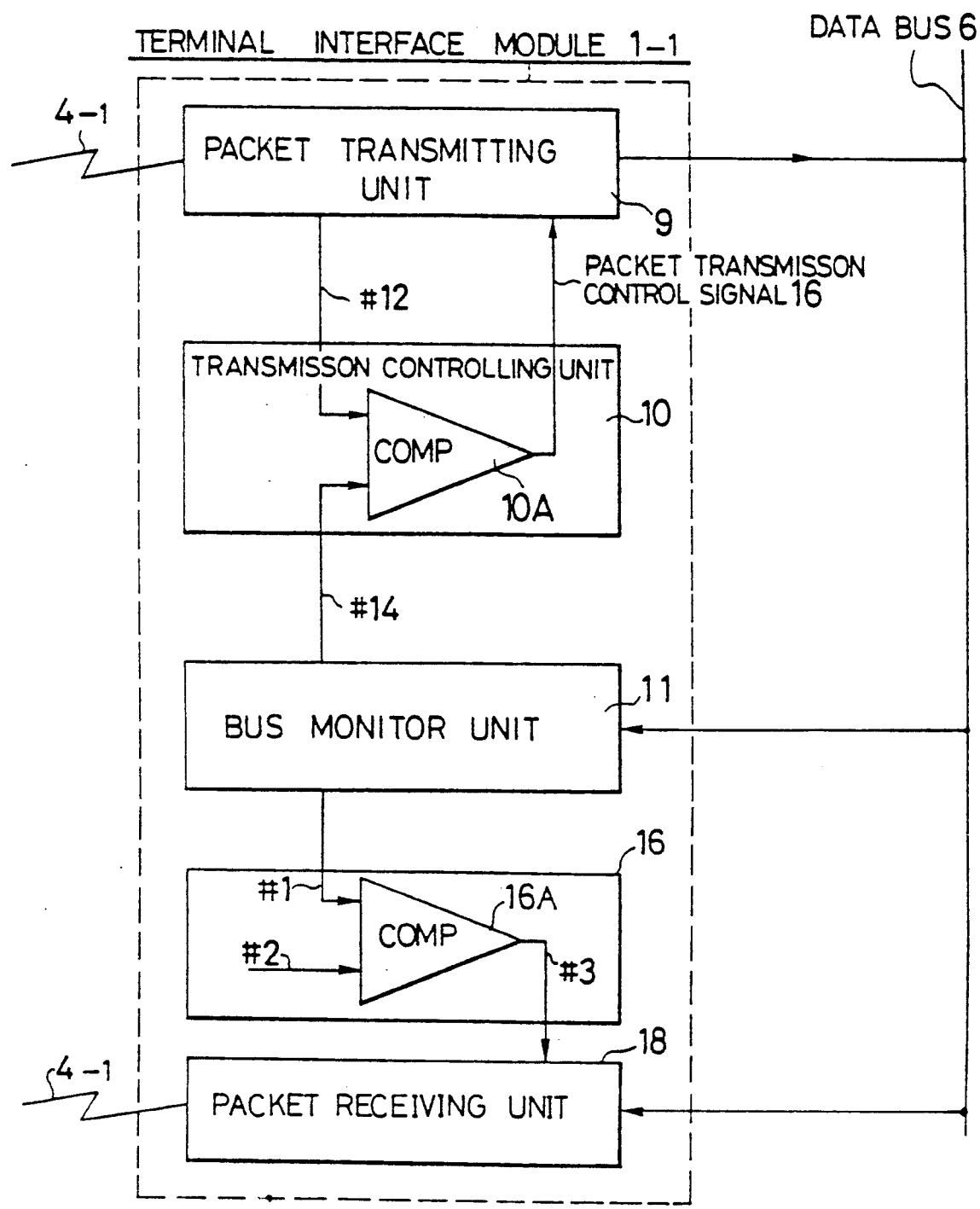
FIG. 2 is a schematic block diagram of an internal circuit of the terminal interface module shown in FIG. 1.
Figure 3:
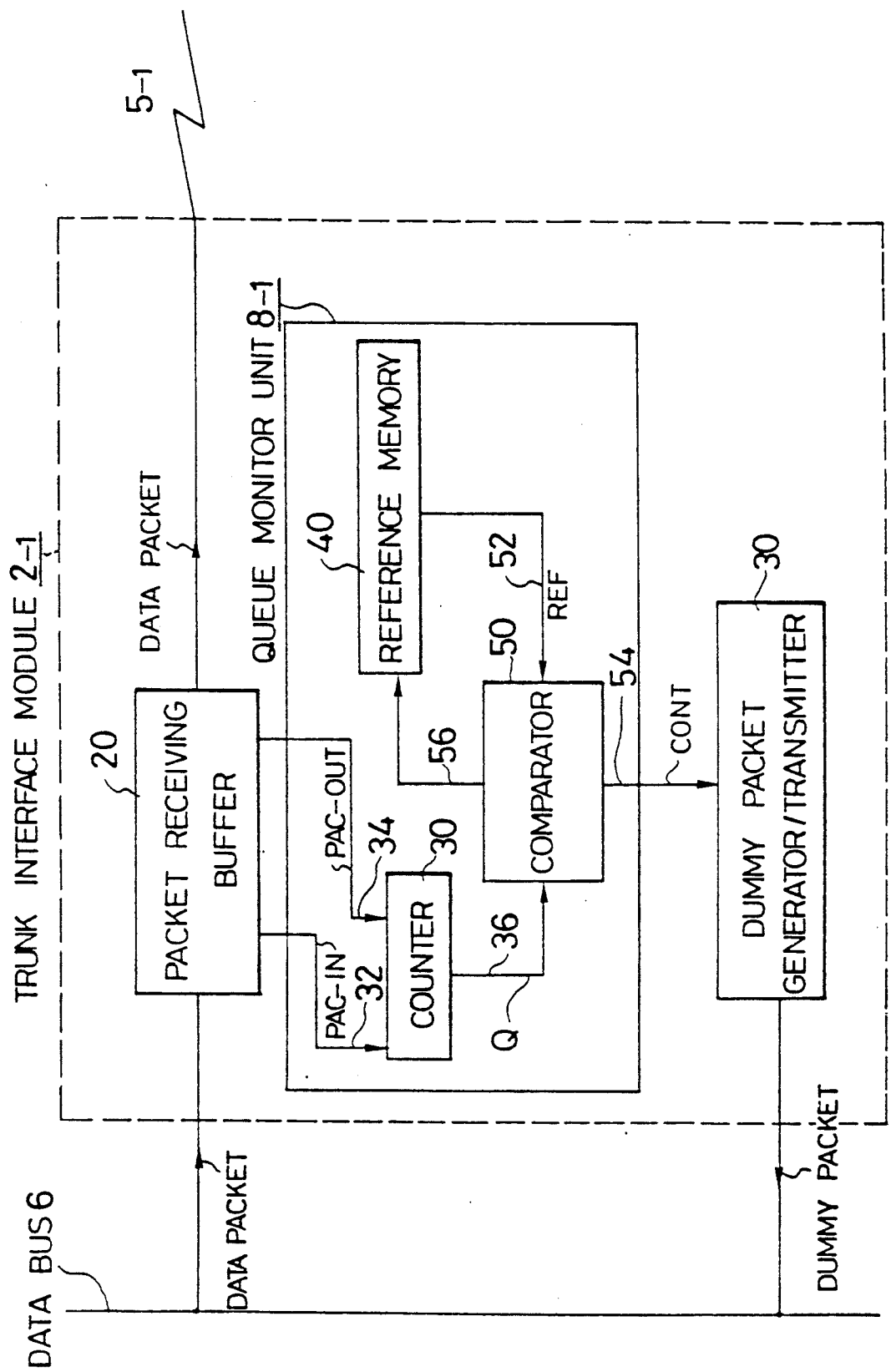
FIG. 3 is a schematic block diagram of an internal circuit of the trunk interface unit illustrated in FIG. 1.

FIG. 1 is an overall arrangement of the bus accessing type packet communication exchange 100. FIG. 2 is an internal circuit of the terminal interface module shown in FIG. 1. FIG. 3 is an internal circuit of the trunk interface module illustrated in FIG. 1.

In the bus accessing type pocket communication exchange 100 according to the first preferred embodiment, a plurality of terminal interface modules 1-1 to 1-N (N>2) are connected to a common data bus 6. Similarly, a plurality of trunk interface modules 2-1 to 2-M (M>2) are connected to this data bus 6. A call controller 3 is also connected to the data bus 6. When these modules 1-1 to 1-N and 2-1 to 2-M simultaneously access the data bus 6 for the packet communication purposes, contention disputes between the modules occur on this data bus 6. According to the preferred embodiment, in case a module contention occurs on the data bus 6, each of these modules 1 and 2 has a function capable of monitoring the result of this contention, and the module which has failed in this contention can again access the data bus in the subsequent accessing timing.

Specifically, in the corresponding trunk interface modules 2-1 to 2-M, there are employed a plurality of queue monitor units 8-1 to 8-M. One end of plural trunk lines 4-1 to 4-N is connected to the respective terminal interface modules 1-1 to 1-N, whereas the other end thereof is connected to each of the terminals (not shown in detail). Similarly, a plurality of trunk lines 5-1 to 5-M are connected to the corresponding trunk interface modules 2-1 to 2-M.

Internal Arrangement of Terminal Interface Module

Referring now to FIG. 2, an internal arrangement of the terminal interface module 1-1 will now be described. It should be understood that each of the remaining terminal interface modules 1-2 through 1-N employs the same internal arrangement as that of FIG. 2.

As shown in FIG. 2, this terminal interface module 1-1 includes a packet transmitting unit 9, a packet transmission controlling unit 10, a bus monitor unit 11, a reception controlling unit 16, and a packet receiving unit 18. The packet transmission controlling unit 10 includes a comparator 10A. The reception controlling unit 16 includes a comparator 16A.

In the terminal interface module 1-1, the bus monitor unit 11 functions to monitor the results of the data bus contention, and continuously reports the contention results to the transmission controlling unit 10. The function of the transmission controlling unit 10 is to control a time period during which the packet transmitting unit 9 of the terminal interface unit 1-1 stops accessing the data bus 6 under the condition that this terminal interface unit 1-1 failed in the data bus contention.

More specifically, a header #12 of the packet in contention at the bus 6, which has been input from the terminal side (not shown) into the packet transmitting unit 9 is supplied to one input terminal of the comparator 10A. A contention result #14 sent from the bus monitor unit 11, is supplied to the other input terminal of this comparator 10A. When comparing the header #12 with the contention result #14, and the contention header #12 corresponds to the contention result #14, a control signal 16 for controlling the bus access by the data packet is transmitted from an output terminal of the comparator 10A to the packet transmitting unit 9.

From the bus monitor unit 11, a destination address #1 to be sent to the data bus is derived and then supplied to one input of the comparator 16A in the reception controlling unit 16. To the other input of this comparator 16A, an address #2 specific to the terminal interface module 1-1 is supplied. Thus, the comparator 16A compares the destination address #1 with the specific address #2, and outputs a result signal #3 to the packet receiving unit 18. When the destination address #1 is equal to the specific address #2, the packet receiving unit 18 fetches the data packet.

On the other hand, the packet transmitting unit 9 controls sending the packet to the data bus in response to the packet transmission control signal 16.

Internal Arrangement of Trunk Interface Module

Referring now to FIG. 3, an internal arrangement of the trunk interface module 2-1 will be described. The trunk interface module 2-1 is mainly constructed by a packet receiving buffer 20, a queue monitor unit 8-1 and a dummy packet generator/transmitter 30. The packet receiving buffer 20 receives the packets from the data bus 6, and temporarily stores them. Thus, the queue packets (having a queue packet length "Q") temporarily stored in the buffer 20 are continuously monitored by the queue monitor unit 8-1. When the queue packet length "Q" monitored by the queue monitor unit 8-1 exceeds a predetermined first threshold level, a control signal 54 is supplied from the queue monitor unit 8-1 to the dummy packet generator/transmitter 30. In response to this control signal, a dummy packet is generated and thereafter transmitted to the data bus 6 from the dummy packet generator/transmitter 30. In other words, if the amount of the packets (i.e., queue packet length "Q") temporarily stored in the packet receiving buffer 20 is greater than the first threshold value (level), namely, if the waiting time of the packet to be output to the trunk line 5-1 is longer than a predetermined time, the dummy packet is produced and sent to the data bus 6. As a result, the terminal interface module 1-1 can access the data bus 6 where the contention is reduced.

There are two different types of dummy packets derived from the packet generator/transmitter 30. First, a dummy packet is such that this packet surely wins the bus contention. Another dummy packet is such that this packet has a high probability to win the bus contention. That is, while the queue packet length of the trunk interface module 2-1 is greater than the first threshold level and thereafter, this queue packet length is smaller than a predetermined second threshold level, this trunk interface module 2-1 generates the dummy packets and sends them to the data bus 6. As a consequence, the packet transmission timing from the terminal interface module 1-1 is controlled.

That is to say, when the dummy packets are transmitted to the data bus 6, this condition on the data bus 6 is monitored by the bus monitor unit 11 of the terminal interface module 1-1. Based on the monitoring result, the packet transmission from the packet transmitting unit 9 of the terminal interface unit 1-1 to the data bus 6 is controlled. In this case, there are four bus-access waiting methods for this terminal interface module 1-1 (which will be discussed later). Thus, the packet transmitting unit 9 accesses the data bus 6 at a bus accessing timing determined by these bus-access waiting methods.

It should be noted that since the above-described internal arrangement of the trunk interface module 2-1 is the same as that of the remaining trunk interface modules 2-2 to 2 M, no description thereof is made.

Dummy Packet Generation

Figure 4:
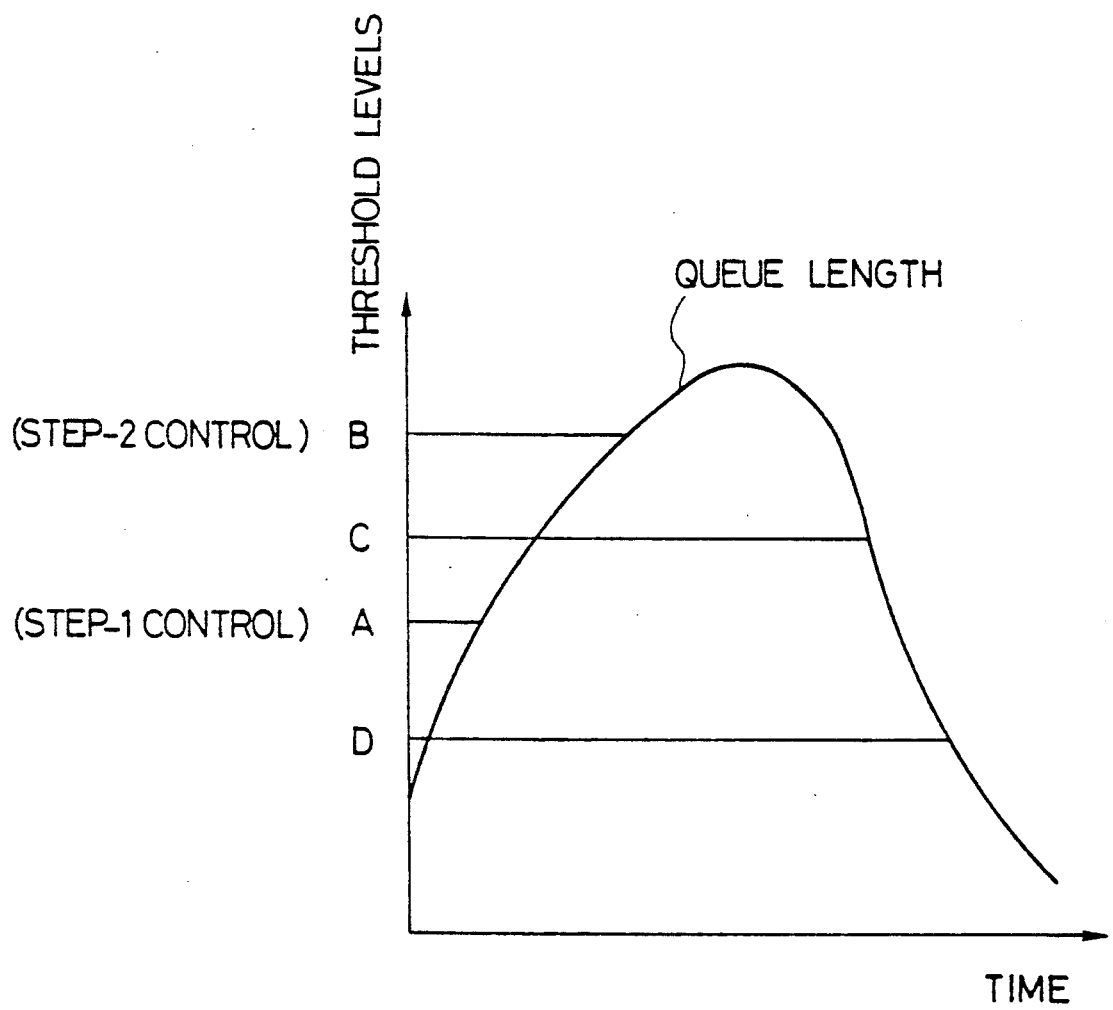
FIG. 4 is a graphic representation for showing a relationship between the queue packet length and threshold levels.

Referring now to also FIG. 4, a detailed description will be made of the above-described dummy packet generation. FIG. 4 is a graphic representation showing a relationship between threshold values "A" to "D" which have been previously stored in the reference memory 40 of the queue monitor unit 8-1, the queue packet length and the time lapse.

Upon receipt of the data packet from the data bus 6 into the packet receiving buffer 20 shown in FIG. 3, a first output signal (PAC-IN) 32 is output from packet receiving buffer 20. This first output signal 32 is supplied to one input terminal of the counter 30. When the data packet temporarily stored in this buffer 20 is output to, for instance, the trunk line 5-1, a second output signal (PAC-OUT) 34 is output, and then supplied to a second input terminal of the counter 30. Upon receipt of the first output signal 32, this counter 30 counts up its count value by +1, whereas this counter 30 counts down its count value by −1 when receiving the second output signal. As a result, the counter 30 outputs the number of the data packets which are stored in the buffer 20.

This output 36 from the counter 30 is supplied to one input terminal of the comparator 50, whereas a reference value 52 derived from the reference memory 40 is supplied to the other input terminal thereof. These input values are compared in this comparator 50. A control signal 54 is derived from this comparator 50 when the load control is required in the packet communication exchange 100, and then supplied to the dummy packet generator/transmitter 30, whereby the necessary dummy packets are sent to the data bus 6.

A comparison result signal 56 is fed back to the reference memory 40 from the comparator 50.

The reference value 52 previously stored in the reference memory 40 will now be described.

As illustrated in FIG. 4, according to the preferred embodiment, four threshold levels "A" to "D" for the load controlling criterion have been employed. These four levels "A" to "D" have been previously stored in the reference memory 40 of the queue monitor unit 8-1.

The first threshold level "A" is to commence a step-1 control. The second threshold level "B" is to start a step-2 control. The third threshold level "C" is to release the step-2 control. Finally, the fourth threshold level "D" is to release the step-1 control. In general, the relationships between them are set as follows:

$$A \geq D, B \geq C, \text{ and furthermore } C \geq A.$$

Figure 5:
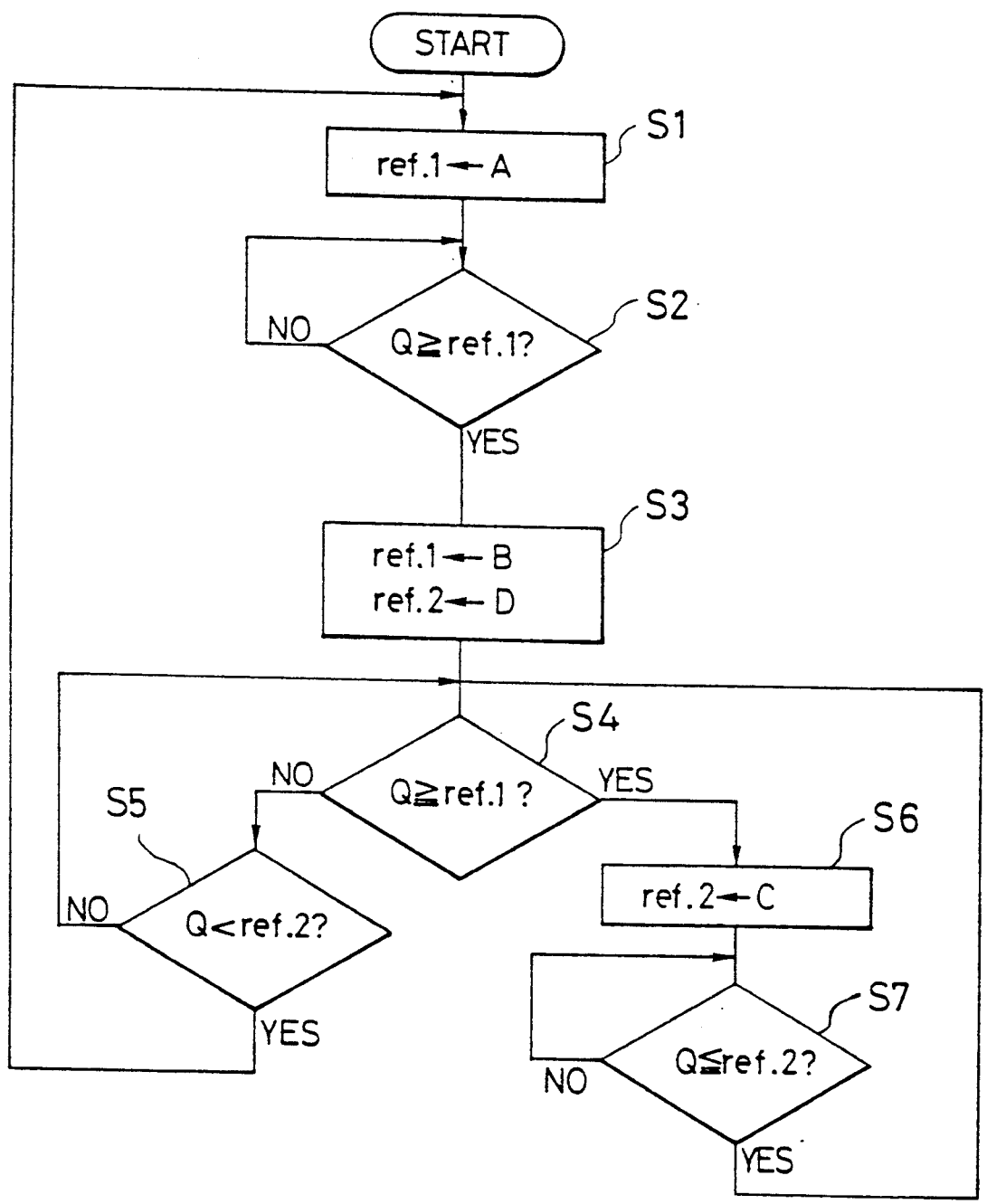
FIG. 5 is a flowchart for explaining the operations of the queue monitor unit shown in FIG. 1.

Then, a comparison operation by the queue monitor unit 8-1 in the first data bus accessing type packet communication exchange 100, as a major feature thereof, will now be described with reference to a flowchart shown in FIG. 5, and also the circuit of FIG. 3.

In a first step S1, the above-described first threshold level "A" is set into the memory 40 as a reference value No. 1. In a next step S2, an amount of the queue packets, i.e., the queue packet length "Q" which has been stored in the packet receiving buffer 20 is supplied from the counter 30 into one input terminal of this comparator 50. The reference value No. 1 (referred to as "ref. 1") which has been set in the reference memory 40 is supplied to the other input terminal of the comparator 50 for the comparison purpose. If No, then the process is returned to the previous step S2. If Yes, then the process is advanced to a next step S3. In this step S3, the second threshold level "B" and fourth threshold level "D" are set as the reference values No. 1 and No. 2 into the reference memory 40. As a result, the output signal 54 of the comparator 50 corresponds to a step-1 control signal.

In the subsequent step S4, a check is made whether or not this newly set reference value No. 1 is greater than the above-described queue packet length "Q". If No, the process is advanced to a step S5, where another check is made on Q<ref. 2. If No again, the process is returned to the previous step S4. To the contrary, if Yes in this step S5, the process is returned to the first step S1 since the queue packet length "Q" which has been stored in the packet receiving buffer 20 is lower than the minimum threshold level "D" (see FIG. 4). That is to say, this condition implies that there is a least amount of the queue packets temporarily stored in the buffer 20. At this case, the output signal 54 of the comparator 50 corresponds to a step-1 control release signal.

In the step S4, on the other hand, if a judgement result is Yes, the process is advanced to a next step S6. In this step, the third threshold level "C" is newly set as the reference value No. 2 in the reference memory 40. As a result, the output signal 54 of the comparator 50 corresponds to a step-2 control signal. In the subsequent step S7, a judgement is made whether or not the queue length "Q" is lower than this new reference value No. 2. If No, then the process is again returned to the step S7. To the contrary, if Yes, the process is returned to the previous step S4. In this case, since the present queue packet length "Q" is smaller than the third threshold level "C", the output signal 54 of the comparator 50 corresponds to the step-1 control signal.

The above-described step control operations will now be summarized.

When the queue packet length "Q" exceeds the first threshold level "A", the step-1 control is performed (namely, the dummy packets are sent from the dummy packet generator/transmitter 30 to the data bus 6.) As a consequence, the amount of the queue packets (i.e., the queue packet length "Q") becomes small, and thereafter becomes lower than the fourth threshold level "D". At this time, this step-1 control is accomplished, or ended. When the amount of the queue packets exceeds the second threshold level "B", the step-2 control is executed. Thereafter, when this amount is lower than the third threshold level "C", this step-2 control is completed, or stopped.

While there has been described in detail, only when the amount of the data packets to be sent to the trunk line 5, which have been temporarily stored in the packet receiving buffer 20 of the trunk interface module 2, i.e., the queue packet length "Q" is within a predetermined quantity which is determined by the first to fourth threshold levels "A" to "D", the dummy packets are transferred from the dummy packet generator/transmitter 30 to the data bus 6 in order to perform the load control of the packet communication exchange 100.

Load Controlling Method

A description will now be made of the load control method of the bus accessing type packet communication exchange 100 according to the first preferred embodiment with reference to FIGS. 1 to 3.

That is, the load control of the packet communication exchange 100 is performed in such a manner that, for instance, the terminal interface module 1-1 again performs the bus accessing operation to the data bus 6 after a predetermined time period has passed, when this terminal interface module 1-1 fails in the packet transmission contention occurring in the data bus 6. The packets are to be transmitted from these terminal interface modules 1-1 to 1-N. The waiting time period for the bus accessing operation when the module fails in the packet transmission contention, will be determined based on the following four methods.

1) The data bus accessing operation waits more than two times for the same predetermined time periods at the respective modules. Thereafter, this accessing operation is performed at the subsequent access timing.

2) The data bus accessing operation waits only one time for the same predetermined time periods at the respective modules.

3) The data bus accessing operation waits more than two times only for a time period specific to each of the modules.

4) The data bus accessing operation waits only one time for a time period specific to each of the modules.

The above-described waiting time determination methods will now be explained in detail.

In the packet communication exchange 100 according to the first preferred embodiment, as illustrated in FIGS. 1 to 3, the load control of this exchange 100 is carried out based upon the queue packet length "Q" temporarily stored in the packet receiving buffer 20. The bus monitor unit 11 of the terminal interface module 1 shown in FIG. 2 functions to monitor the contention result on the data bus 6. Then, the contention result is continuously announced to the transmission controlling unit 10. This transmission controlling unit 10 controls the bus accessing interruption time when the module in question fails in the packet contention occurring on the data bus 6 in accordance with the contention result thereon. As previously described, in case that the bus accessing operation waits more than two times for the same predetermined time periods at the respective terminal modules (No. 1) and also waits more than two times for the time period specific to the respective terminal modules, there are two different controlling ways for the bus accessing interruption time. First, the transmission controlling unit 10 in the terminal interface module 1 controls the bus accessing interruption time. Secondly, the transmission controlling unit 10 merely announces to the packet transmitting unit 9 that the module in question fails in this contention, and the packet transmitting unit 9 receiving this announcement controls the bus accessing interruption time.

On the other hand, in the case when the data bus accessing operation waits only one time for the same predetermined time periods at the respective terminal interface modules (No. 2), and also waits only one time for the time specific to the respective terminal interface modules, either the transmission controlling unit 10, or the packet transmitting unit 9 furthermore functions to confirm whether or not the present contention occurring on the data bus corresponds to a first contention. Then, the data bus accessing operation by this module is carried out at the original bus synchronization timing after occurrences of the second contention and the subsequent contentions.

Second Bus Accessing Type Packet Communication Exchange

A bus accessing type packet communication exchange 200 according to a second preferred embodiment will now be described.

Figure 6:
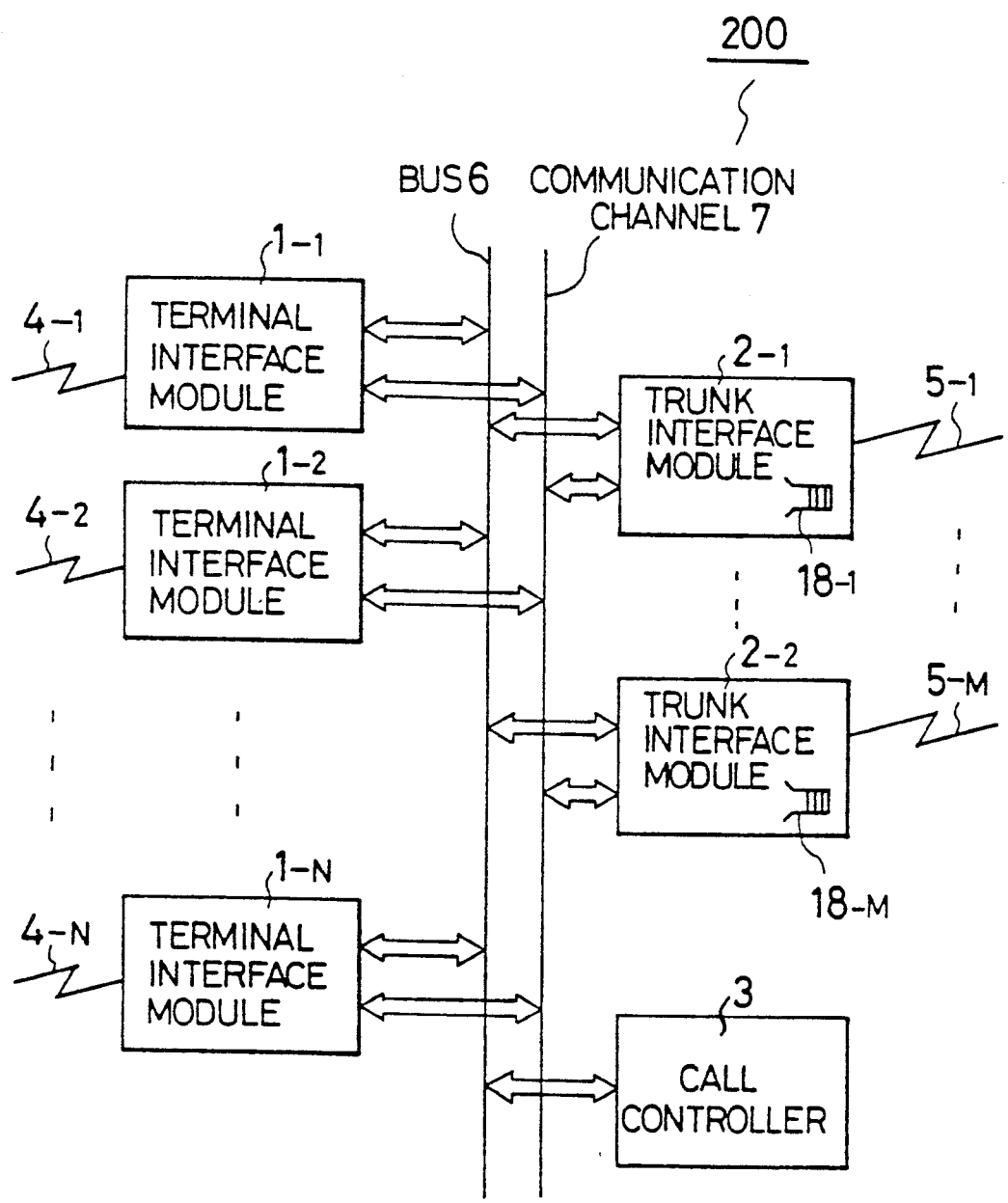
FIGS. 6 to 8 are schematic block diagrams of a bus accessing type packet communication exchange 200 according to a second preferred embodiment.
Figure 7:
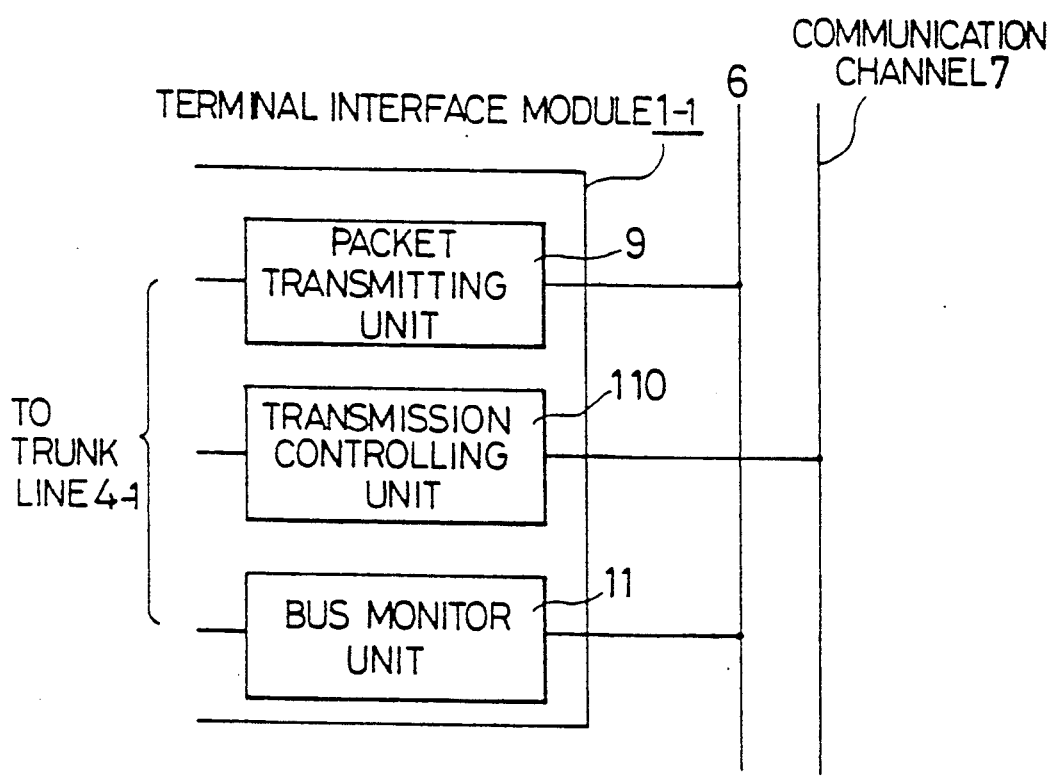

In FIG. 6, there is shown an entire circuit arrangement of the exchange 200. FIG. 7 is an arrangement of the terminal interface module shown in FIG. 6 and FIG. 8 is an arrangement of the trunk interface module shown in FIG. 6.

Figure 8:
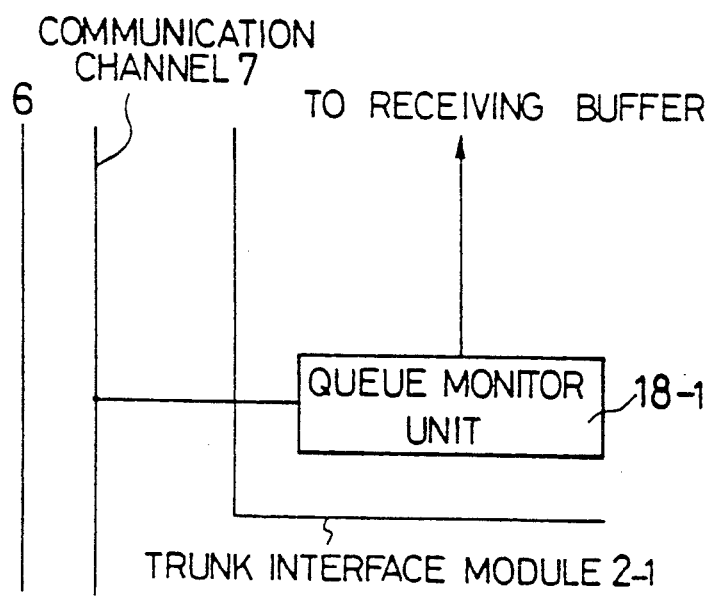

It should be noted that the same reference numerals denoted in the first preferred embodiment will be employed to indicate the same or similar circuit elements shown in FIGS. 6 to 8, and no further explanation thereof is made.

In FIG. 6, a plurality of terminal interface modules 1-1 to 1-N are similarly connected to the data bus 6. A plurality of trunk interface modules 2-1 t2-M are also connected to the common data bus 6. The call controller 3 is connected to the data bus 6. The queue monitor units 8-1 to 8-M are employed within the corresponding trunk interface modules 2-1 to 2-M. A communication channel 7 is employed to be connected to these terminal interface modules 1-1 to 1-N and trunk interface modules 2-1 to 2-M. The function of this communication channel 7 is to send the control information from the trunk interface modules 2-1 to 2-M to the terminal interface modules 1-1 to 1-N. The flow of the information signal is as follows. For instance, the data packets are input from the trunk lines 5-1 to 5-M connected to the trunk interface modules 2-1 to 2-M, whereas the data packets are output from the trunk lines 4-1 to 4-N connected to the terminal interface modules 1-1 to 1-N. Also, in the second preferred embodiment, the terminal interface modules 1-1 to 1-N are connected to the trunk interface modules 2-1 to 2-M via the synchronization type data bus 6 as the communication medium, which is similar to the first preferred embodiment. That is, the packet transmission contention is controlled by employing this synchronization type bus switch.

As shown in FIG. 8, the trunk interface module 2-1 includes a queue monitor unit 18-1 for monitoring the amount of the queue packets temporarily stored in the packet receiving buffer 20, and the communication channel 7 for transferring the control signal to the terminal interface module 1-1 shown in FIG. 6. The queue monitor unit 18-1 detects two cases: when the amount of the queue packets in the buffer exceeds a predetermined value, and when the amount thereof becomes smaller than this value. As a result of this detection, the queue monitor 18-1 sends a control signal to the terminal interface module 1 so as to control the bus accessing interruption time when this terminal interface module 1 fails in the packet contention occurring on the data bus 6.

The terminal interface module 1-1 includes the packet transmitting unit 9, a transmission controlling unit 110, a bus monitor unit 11 and the communication channel 7, as illustrated in FIG. 7. The bus monitor unit 11 functions to monitor the contention results occurring on the data bus 6 and to send the contention results to the transmission controlling unit 110. The functions of the transmission controlling unit 110 are to confirm the control signal which has been sent from the trunk interface module 2 via the communication channel 7; to control the packet transmitting unit 9 based upon the content of this control signal when the terminal interface module in question fails in the contention; and finally to control the bus accessing timing by the terminal interface module 1.

It should be noted that the bus accessing interruption time of the packet transmission unit 9 can be controlled based on the above-explained four determination methods in case of the contention failure.

It has been described that, in the exchange 200 according to the second preferred embodiment shown in FIGS. 6 to 8, the load control operation of the exchange 200 is performed only when there is a predetermined amount of the queue packets in the buffer of the trunk module 2, and the memory capacity of this buffer connected to the respective queue monitor units 18-1 to 18-M is within a constant value. In other words, the load control of the exchange 200 is performed based upon the queue packet length "Q" in the buffer.

Third Bus Accessing Type Packet Communication Exchange

Figure 9:
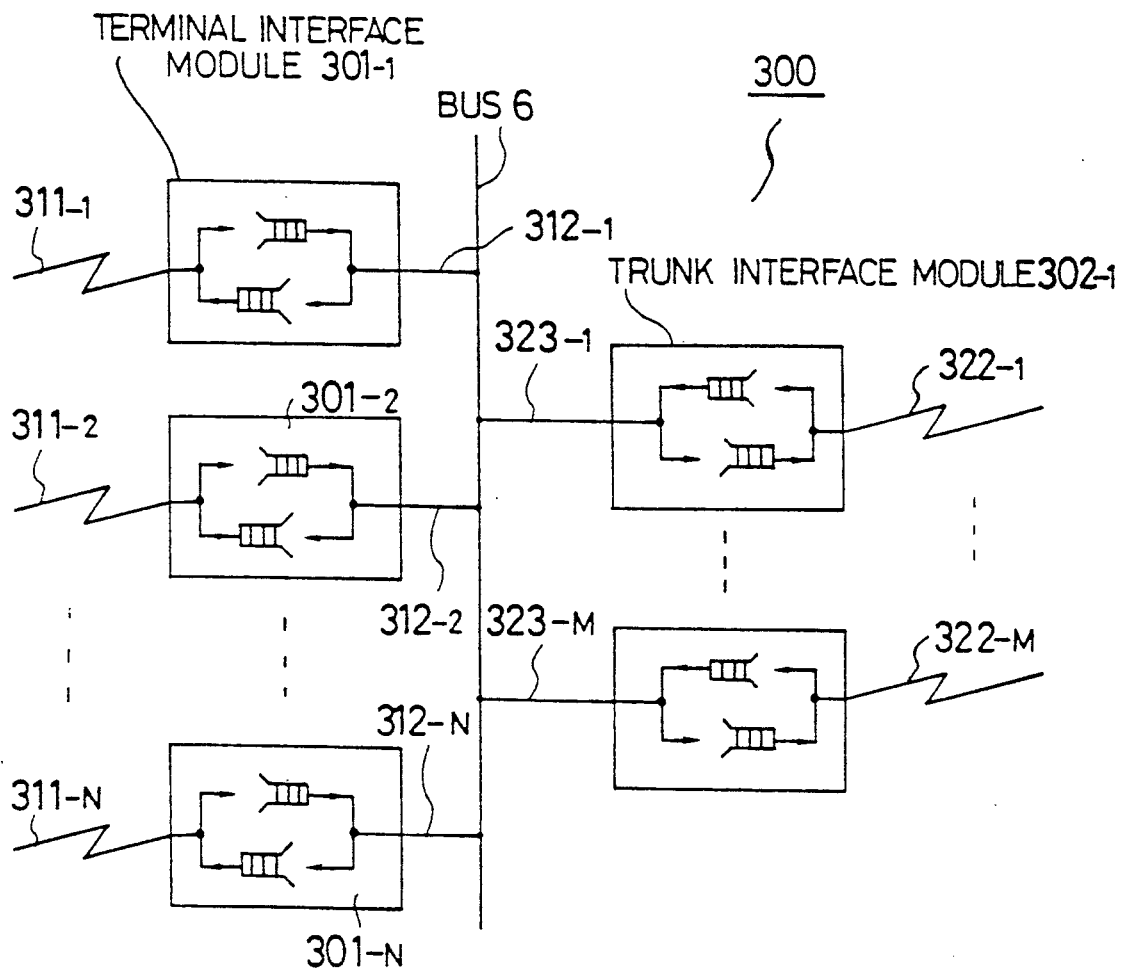
FIG. 9 through 11 are schematic block diagrams of a bus accessing type packet communication exchange 300 according to a third preferred embodiment; and, FIG. 12 and 13 are schematic block diagrams of a bus accessing type packet communication exchange 400 according to a fourth preferred embodiment.
Figure 10:
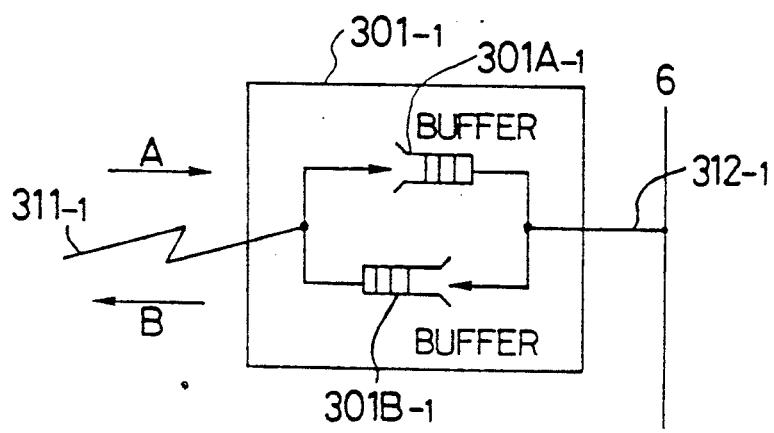
Figure 11:
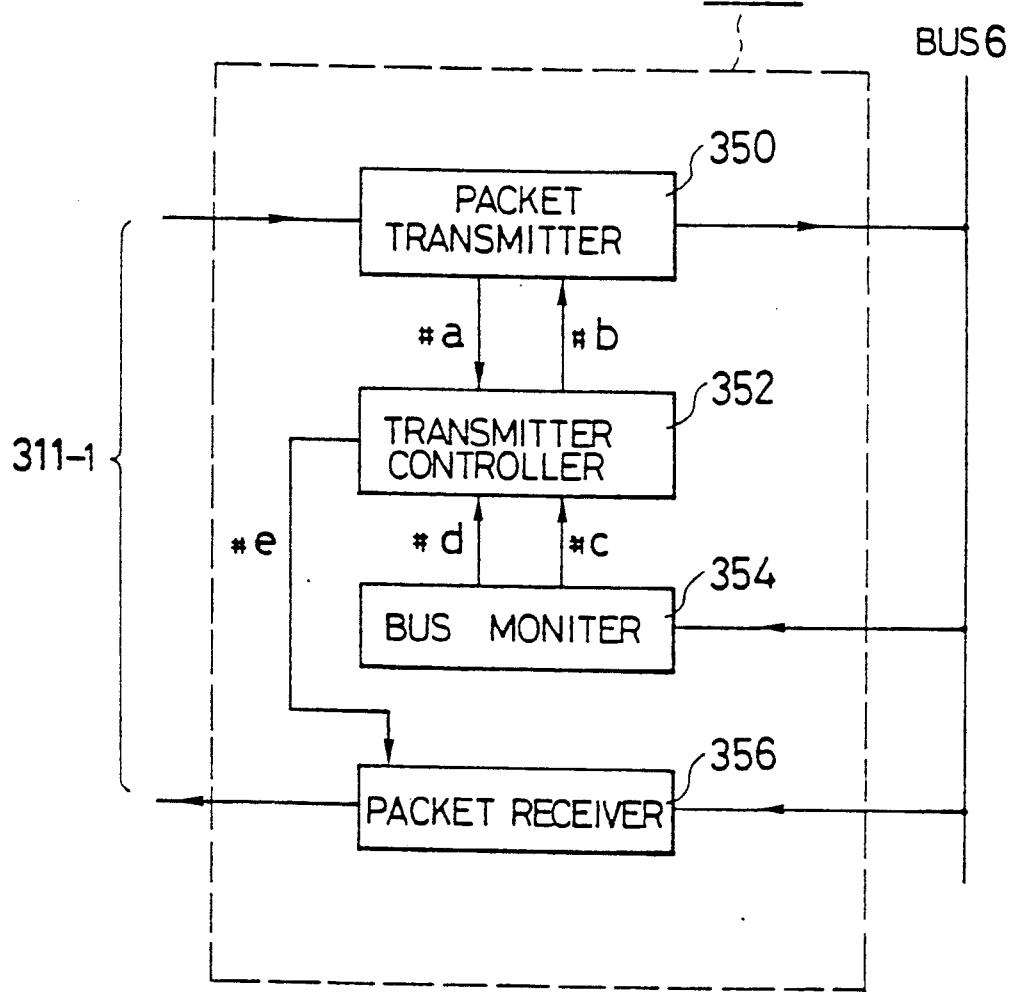

Referring now to FIGS. 9 to 11, a bus accessing type packet communication exchange 300 will be described.

In FIG. 9, there is shown an entire arrangement of the exchange 300. "N" stages of terminal interface modules 301-1 to 301-N are connected via terminal trunk lines 311-1 to 311-N and lines 312-1 to 312-N capable of performing bidirectional communications to the data bus 6. Similarly, "M" stages of trunk interface modules 302-1 to 302-M are connected to the common data bus 6 via high-speed digital trunk lines 322-1 to 322-M and 323-1 to 323-M capable of performing the bidirectional communication.

Both the terminal interface modules 301 and trunk interface modules 302 have the same internal arrangements, as illustrated in FIG. 10. That is, two buffers 301A-1 and 301B-1 are included in the terminal interface module 301-1 shown in FIG. 10.

Operations of this exchange 300 will be summarized. First, a data packet is input as a stream "A" into the buffer 301A-1. A contention information signal of a head packet of this data packet is output to the data bus 6.

Then, while monitoring the contention result on the data bus 6, the data packet is output from the buffer 301A-1 to the data bus 6 if this terminal interface module 301-1 wins the packet contention. In this case, before outputting the data packet, a destination address is output to the data bus 6. To the contrary, when the terminal interface module 301-1 fails in this packet contention, no data packet is output from the buffer 301A-1 to the bus 6.

When the destination address of the data packet output on the data bus 6 is coincident with another destination address of own module, for instance, the terminal interface module 301-1, this data packet is fetched into the buffer 301B-1 of own module. Thereafter, the data packet is output from this buffer 301B 1 as a stream B to the trunk line 311-1.

An internal arrangement of the terminal interface module 301 is shown in FIG. 11. This internal arrangement is the same as that of the trunk interface module 302. This module 301 is arranged by a packet transmitter 350, a transmitter controller 352, a bus monitor 354 and a packet receiver 356. In this packet transmitter 350 and packet receiver 356, the above-described buffers 301A-1 and 301B-1 are built.

Various signals of the terminal interface modules 301-1 will now be described.

A signal #a indicates a contention information signal to be output to the data bus 6.

A signal #b is an announcement signal for announcing the contention result. A signal #c is produced by comparing the first signal #a with the second signal #b. Another signal #d indicates a destination address of the data packet output to the data bus 6. A signal #e is a signal for announcing whether or not the data packet output to the data bus 6 is fetched.

In the transmitter controller 352, the comparison operations are performed between the first and second signals #a and #b, and furthermore between the fourth signal #d and the address of its own module.

Fourth Bus Accessing Type Packet Communication Exchange

Figure 12:
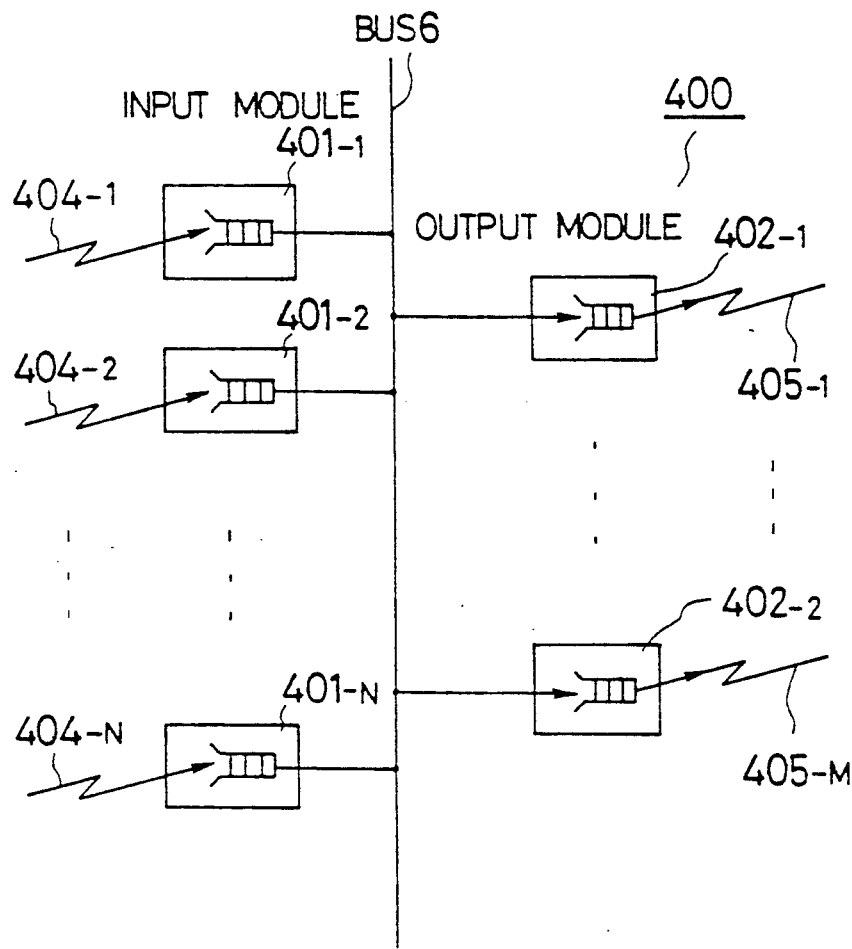

A bus accessing type packet communication exchange 400 according to a fourth preferred embodiment of the invention will now be described with reference to FIGS. 12 and 13.

"N" stages of input modules 401-1 to 401-N are connected to the common data bus 6, and "M" stages of output modules 402-1 to 402 M are also connected thereto. Both the input modules 401-1 to 401-N and output modules 402-1 to 402-M are connected to trunk lines 404-1 to 404-N and 405-1 to 405-M. In accordance with the preferred embodiment, these input and output modules may be connected to terminal interface trunk lines, or multiplexed lines (not shown in detail), instead of the trunk lines.

Figure 13:
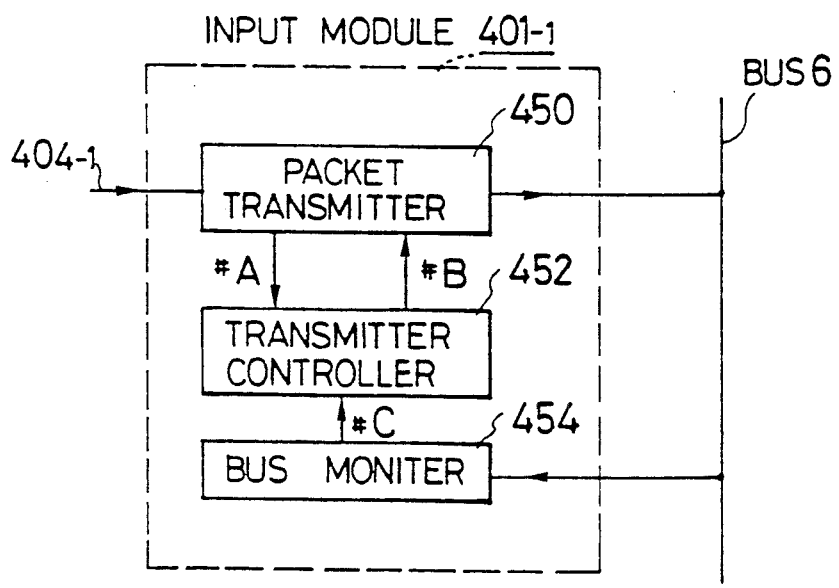

FIG. 13 is an internal arrangement of the input module 401-1. The input module 401-1 includes a packet transmitter 450, a transmitter controller 452, and a bus monitor 454. First, a contention information signal #A to be output to the data bus 6 is supplied to the transmitter controller 452 from the packet transmitter 450. A contention result signal #B is supplied from this transmitter controller 452 to the packet transmitter 450. Also, the bus monitor 454 which has received the information for announcing the contention result on the data bus 6, delivers a packet contention result signal #C to the transmitter controller 452.

It should be noted that since the internal arrangements of the output modules 402-1 to 402-M are the same as those of the truck interface modules 2-1 to 2-M according to the first preferred embodiment (see FIG. 3), no further description thereof is made in the specification.

With the above-described circuit arrangements, the packet communication exchange 400 can perform the load control according to the invention even if the output modules include no bus monitor.

The load controlling operation of this exchange 400 is as follows.

When the queue packet length exceeds a predetermined threshold level, the dummy packets are generated and transferred to the data bus 6 from the output module 402-1. Thus, the bus monitor 405 of the input module 401-1 detects the packet contention occurring on the data bus 6 caused by supplying the dummy packets from the output module 402-1 to the data bus 6. Upon detection of the packet contention, the transmitter controller 452 sends the contention result signal #B to the packet transmitter 450. As a consequence, the packet transmitter 450 does not transmit a new data packet to the data bus 6 so as to avoid a further packet contention thereon. Therefore, the data packet's discard due to an overflowing data packet from the buffer of the output module can be prevented.

Alternative Trunk Interface Modules

Figure 14:
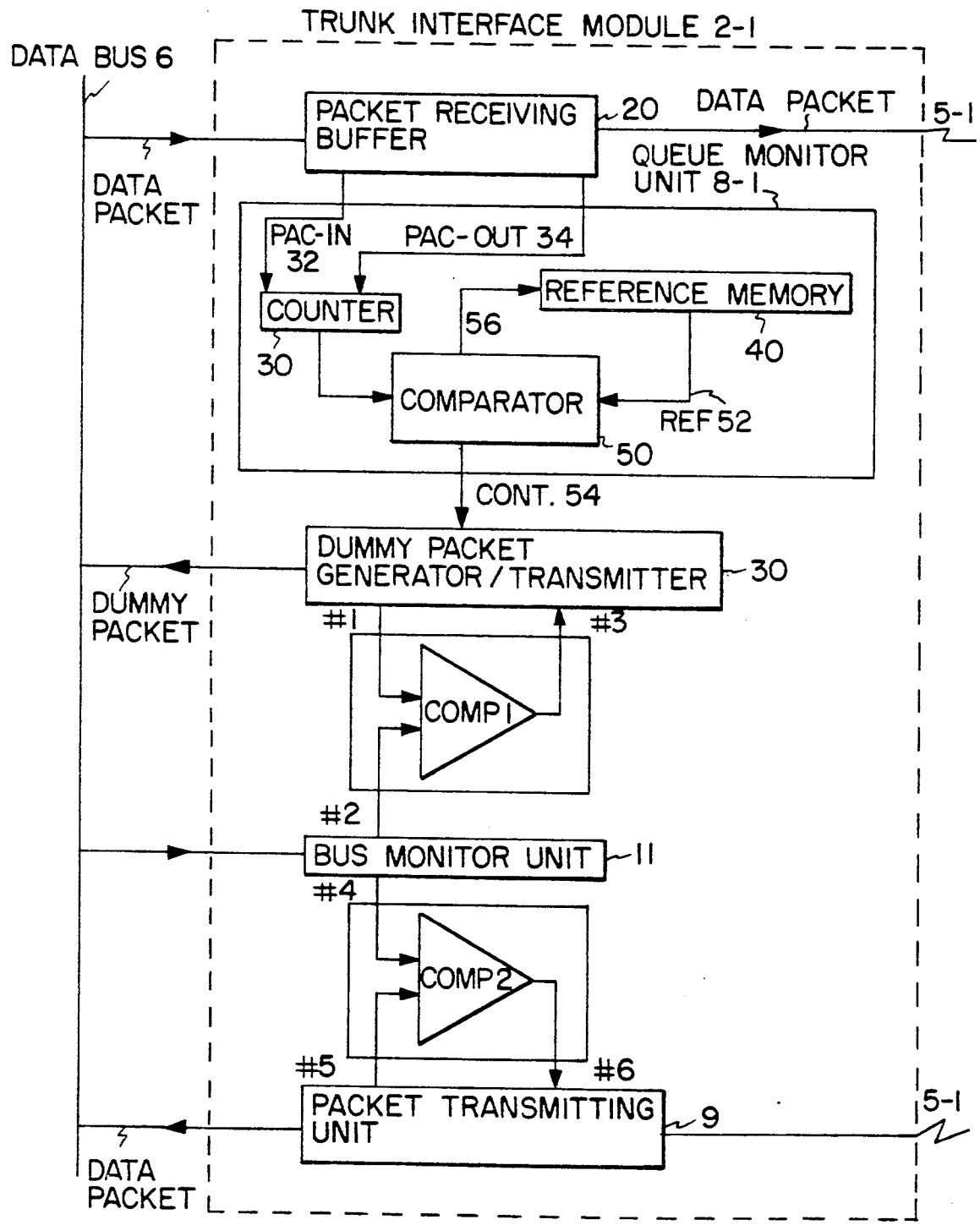
FIG. 14 represents an additional preferred embodiment employing a dummy packet transmitting module.

FIG. 14 represents an additional preferred embodiment employing a dummy packet transmitting module. It should be noted that no further explanation is provided concerning the operations of the packet receiving buffer 20 and queue monitor unit 8-1, which are the same as in FIG. 3.

In the case when the queue length is smaller than a predetermined value, no contention control is carried out.

Referring now to FIG. 14, when a control signal CONT 54 indicates an OFF-condition, the dummy packet generator/transmitter 30 is not operated. This implies that the dummy packet is neither generated nor transmitted to the data bus 6 for packet contention purposes. On the other hand, the data packet input from the trunk line 5-1 (lower side) to the trunk interface module 2-1 is buffered in a packet transmitting unit 9, a contention control to transmit the data packet is performed, and when the transmission right is obtained by executing the contention control, the data packet is sent out to the data bus 6, i.e., a common communication path. The results of the packet contention occurring on the data bus 6 are continuously monitored by a bus monitor unit 11. Then, a comparator 2 (COMP 2) compares the signal output from the self module, i.e. trunk interface module 2-1, with a signal (contention signal) on the data bus 6. If the self module loses the contention, a comparator output signal #6 is supplied to the packet transmitting unit 9 so as to cease the data packet transmission. Conversely, when the self module wins the contention, the comparator output signal #6 is utilized to output the data packet from the packet transmitting unit 9.

In the case when the queue length is greater than a predetermined value, contention control is performed. In FIG. 14, when the control signal CONT 54 indicates an ON-condition, the dummy packet generator/transmitter 30 is under control. That is, this dummy packet generator/transmitter 30 controls the transmission of the dummy packet based upon the control signal 54. There are three controlling methods:

1. Controlling a contention parameter of a dummy packet.
2. Controlling a transmission frequency of a dummy packet.
3. Controlling both a contention parameter of a dummy packet and a transmission frequency of a dummy packet.

In the case when the packet transmission right cannot be finally obtained as a result of the contention of the dummy packets on the data bus 6, no dummy packet is transferred to the data bus 6. That is, the result of the contention occurring on the data bus 6 are sequentially monitored by the bus monitor unit 11. A comparator 1 (COMP 1) compares the signal output from the dummy packet generator/transmitter 30 with the signal (contention signal) appearing on the data bus 6. When the dummy packet loses this contention, a comparator output signal #3 is furnished to the dummy packet generator/transmitter 30 in order to cease the transmission of the dummy packet. Conversely, when the dummy packet wins the contention, this output signal #3 is employed so as to output the dummy packet from transmitter 30 to the data bus 6.

On the other hand, the data packet input from the trunk line 5-1 (lower side) to the trunk interface module 2-1 is buffered in packet transmitting unit 9, a contention control to transmit the data packet is performed, and when the transmission right is obtained by executing the contention control, the data packet is sent out to the data bus 6, i.e., the common communication path. The results of the packet contention occurring on the data bus 6 are continuously monitored by bus monitor unit 11. Then, comparator 2 (COMP 2) compares the signal output from the self module, i.e., trunk interface module 2-1, with a signal (contention signal) on the data bus 6. If the self module loses the contention, a comparator output signal #6 is supplied to the packet transmitting unit 9 so as to cease the data packet transmission. Conversely, when the self module wins the contention, the comparator output signal #6 is utilized to output the data packet from the packet transmitting unit 9.

In other words, the contention control is carried out during the contention control time by the dummy packet and the data packet derived from other input modules (terminal interface modules) and the data packet transmission is performed. A data packet having such a contention parameter capable of winning the contention control can own the transmission right of the data packet as a result of the contention control. Data packets other than the above-mentioned data packet are not transferred by the dummy packet.

When the contention parameter of the dummy packet is changed by the greatest winning probability, or the transmission frequency of the dummy packets is increased in accordance with an increase in the queue length, the amount of the data packet transmission from the respective input modules is reduced.

Figure 15:
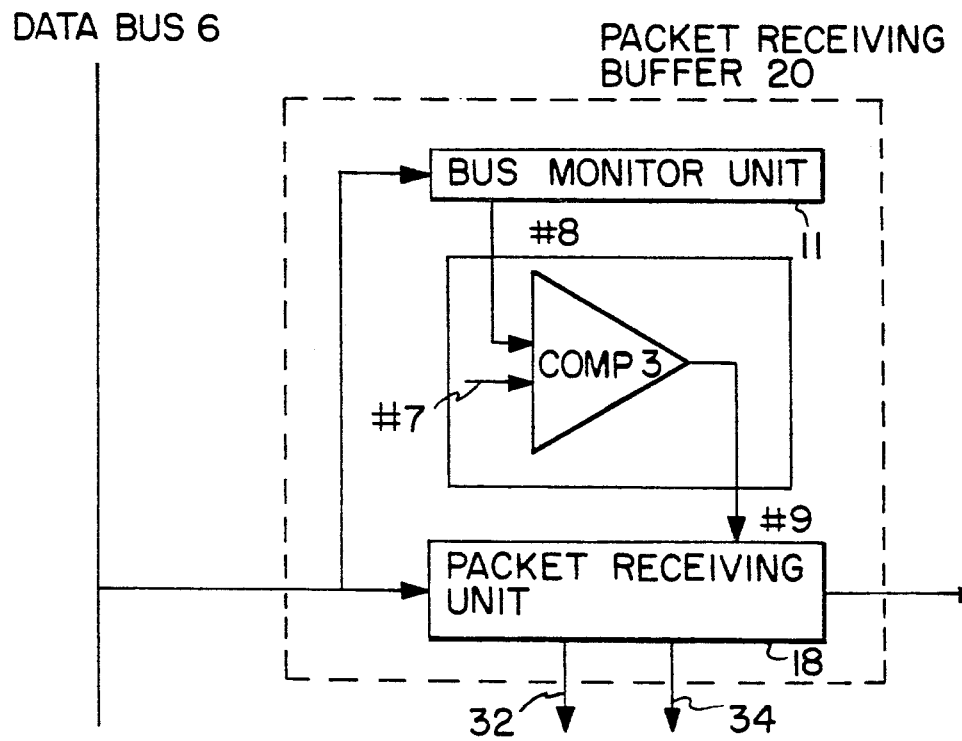
FIG. 15 and 16 are schematic block diagrams of the packet receiving buffer 20 of FIG. 14.
Figure 16:
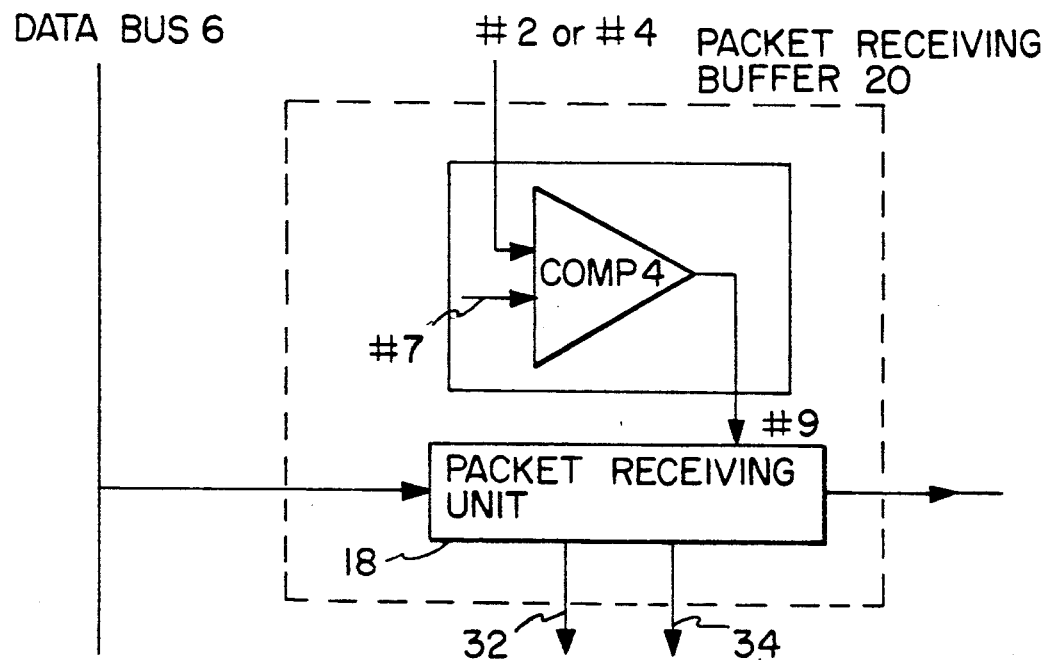

FIGS. 15 and 16 are schematic block diagrams of the packet receiving buffer 20 of FIG. 14.

In FIG. 15, a signal #7 is an address signal of the self module, i.e., trunk interface module 2-1. A comparator 3 (COMP 3) compares a destination address signal #8 to be output to the data bus 6 with the address signal #7 of the self module. When a coincidence is checked by this comparator, the data packet to be output to the data bus 6 is fetched by a packet receiving unit 18.

Figure 17:
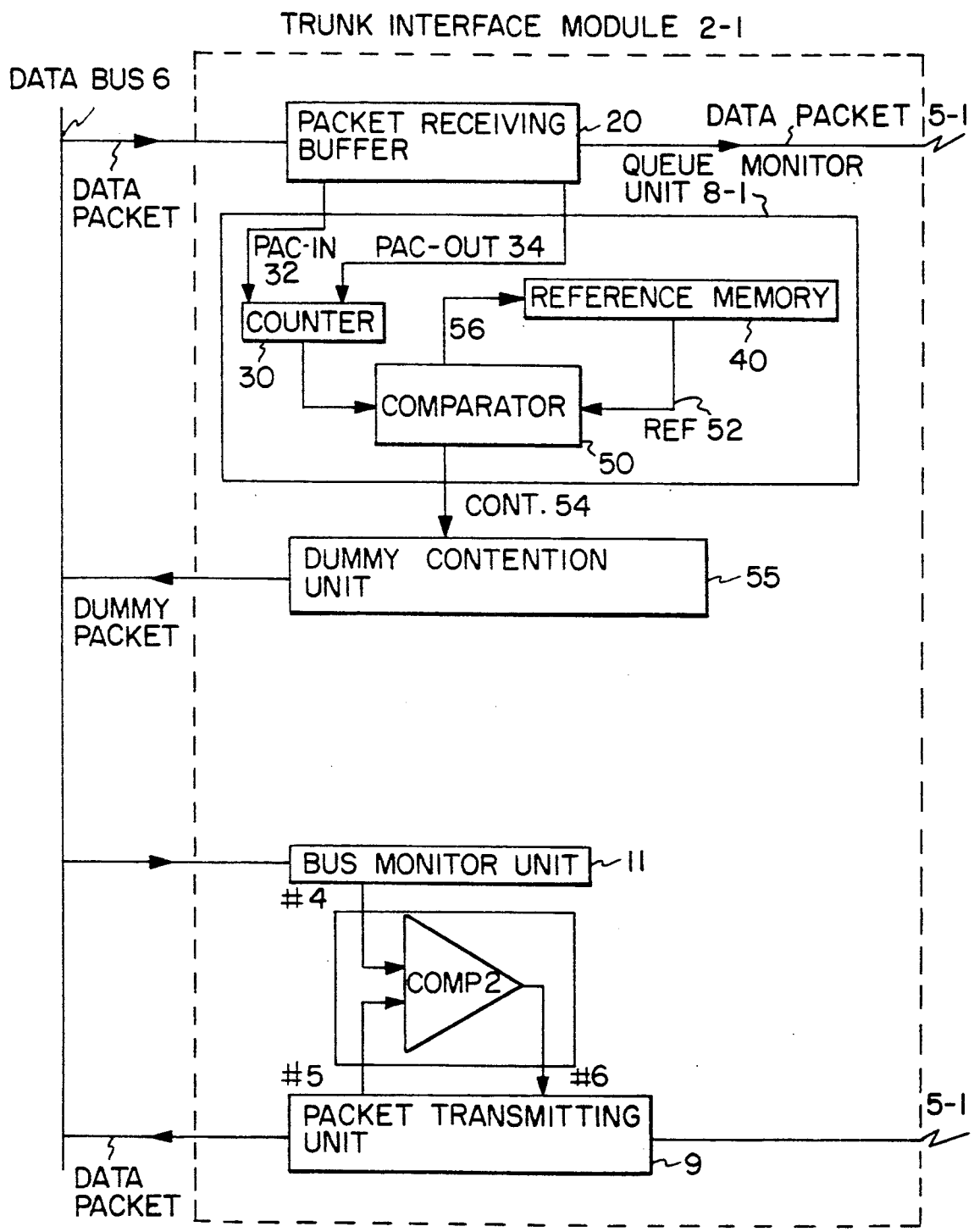
FIG. 17 represents another preferred embodiment employing a dummy contention unit.

Another preferred embodiment is shown in FIG. 17 where there is a dummy contention unit or module 55. It should be noted that no further explanation is provided concerning the operations of the packet receiving buffer 20 and queue monitor unit 8-1, which are the same as in FIG. 3.

In the case when the queue length is smaller than a predetermined value, no contention control is carried out.

Referring now to FIG. 17, a control signal CONT 54 indicates an OFF-condition and therefore the dummy contention unit 55 is operated (no dummy contention is performed). On the other hand, the data packet input from the trunk line 5-1 (lower side) to the trunk interface module 2-1 is buffered in a packet transmitting unit 9, a contention control to transmit the data packet is performed, and when the transmission right is obtained by executing the contention control, the data packet is sent out to the data bus 6, i.e., a common communication path. The results of the packet contention occurring on the data bus 6 are continuously monitored by a bus monitor unit 11. Then, a comparator 2 (COMP 2) compares the signal output from the self module (i.e., trunk interface module 2-1) with a signal (contention signal) on the data bus 6. If the self module loses the contention, a comparator output signal #6 is supplied to the packet transmitting unit 9 so as to cease the data packet transmission. Conversely, when the self module wins the contention, the comparator output signal #6 is utilized to output the data packet from the packet transmitting unit 9.

In the case when the queue length is greater than a predetermined value a contention control is performed.

In FIG. 17, the control signal CONT 54 indicates an ON-condition, and thus the dummy contention unit 55 is under control. That is, this dummy contention unit 55 controls the dummy contention based upon the control signal 54. There are three controlling methods:

1) Controlling a contention parameter of dummy contention.

2) Controlling a transmission frequency of dummy contention.

3) Controlling both a contention parameter of a dummy contention and a transmission frequency of dummy contention.

The data packet input from the trunk line 5-1 (lower side) to the trunk interface module 2-1 is buffered in a packet transmitting unit 9, a contention control to transmit the data packet is performed, and when the transmission right is obtained by executing the contention control, the data packet is sent out to the data bus 6 (i.e., a common communication path). The results of the packet contention occurring on the data bus 6 are continuously monitored by a bus monitor unit 11. Then, a comparator 2 (COMP 2) compares the signal output from the self module (i.e., trunk interface module 2-1) with a signal (contention signal) on the data bus 6. If the self module loses the contention, a comparator output signal #6 is supplied to the packet transmitting unit 9 so as to cease the data packet transmission. Conversely, when the self module wins the contention, the comparator output signal #6 is utilized to output the data packet from the packet transmitting unit 9.

In other words, the contention control is carried out during the contention control time by the dummy contention and the data packet derived from other input modules (terminal interface modules) and the data packet transmission is performed. A data packet having such a contention parameter capable of winning the dummy contention can own the transmission right of the data packet as a result of the contention control. Data packets other than the above-mentioned data packet are not transferred by the dummy packet.

When the contention parameter of the dummy contention is changed by the greatest winning probability, or the transmission frequency of the dummy contention is increased in accordance with an increase in the queue length, the amount of the data packet transmission from the respective input modules is reduced.

Modifications

As is apparent from the foregoing, the present invention is not limited to the above-described preferred embodiments.

For instance, the load control method according to the invention may be applied to not only the above-described bus accessing type packet communication exchanges, but also to a CSMA/CD (carrier sense multiple access/collision decision) type exchange. In other words, the present invention may be realized in any type of packet communication exchanges where the data packet communication is performed via the common communication medium, and the contention control is performed by using the dummy packets in order to obtain the accessing right to utilize this common communication path.

It is not required that each of the communication devices or modules is synchronized with the packet transfer phase.

A wireless communication path may be used as the common communication path such as the data bus 6.

The four reference values "A" to "D" for transferring the dummy packets to the data bus 6 may be changed into other values.

A degree of dummy packet transmission may be stepwise varied in accordance with the queue packet length.

Furthermore, the communication module where the queue packet length becomes large is indicated by a newly introduced control packet. Then, based upon this indication signal, a limitation may be made in the data packet transmission by the communication module where the queue packet length becomes large.

Before the data packets are multiplexed in the trunk interface module, these data packets may wait at the terminal interface module.

In the above-described preferred embodiments, the contention on the data bus was effected between the data packets and the dummy packets. Alternatively, the contention on the data bus may be effected between the dummy packets only.

Thus, it has been described, in the packet communication exchange according to the invention, that the dummy packets are generated depending upon the length of the queue packets temporarily stored in the buffer memory employed in the trunk interface module, whereby the data packet transmission by the terminal interface module to the common communication path is controlled. As a consequence, the probability that excessive data packets are continuously input into the above-described buffer memory can be reduced to a very small value. In addition, the probability that the packets are discarded, which is caused by the large queue packet length in the buffer memory can be also reduced to a very small value.

What is claimed is:

1. A packet communication exchanging apparatus comprising:
   a common communication channel through which a plurality of data packets are communicated;
   a plurality of input module means coupled to said common communication channel for receiving said data packets and transferring said data packets to said communication channel and,
   a plurality of output module means coupled to said common communication channel for temporarily storing said data packets sent from said input module means via said communication channel and for generating/sending a dummy packet to said communication channel when an amount of said data packets temporarily stored therein exceeds a predetermined threshold value;
   each of said output module means including
   a packet receiving buffer for temporarily storing said data packets sent from said input module means via said communication channel as queue data packets;
   a queue packet monitor unit for monitoring an amount of said queue data packets temporarily stored in said packet receiving buffer so as to produce a contention control signal when said amount of said queue data packets exceeds said threshold value;
   a dummy packet generator/transmitter for generating a dummy packet in response to said contention control signal and for transmitting said dummy packet to said communication channel;
   contention monitoring means for monitoring a result of a contention occurring on said common communication channel so as to output a contention result signal; and
   packet transmitting means for transmitting a data packet to said common communication channel in response to said contention result signal, said contention result signal being supplied to said dummy packet generator/transmitter so as to control said dummy packet transmission therefrom, whereby said input module means perform a contention control by employing contention parameters for said contention control effected among said input module means and said output module means, which own transmission requests, in order to transmit both said data packet and said dummy packet before transmitting said data packet to said common communication channel, one of said input module means and output module means, which has obtained a transmission right as a result of said contention control, transmitted said data packet to said common communication channel, and said output module means controlling said contention parameters in response to a queue length of said data packets stored in said packet receiving buffer.

2. A packet communication exchanging apparatus as claimed in claim 1, wherein said queue packet monitor unit includes:
   a counter for counting a quantity of said queue data packets temporarily stored in said packet receiving buffer by receiving a packet reception signal and a packet transmission signal derived from said packet receiving buffer;
   a reference memory for previously storing said threshold value; and,
   a comparator for comparing a quantity of said queue data packets with said threshold value so as to output the said contention control signal to said dummy packet generator/transmitter.

3. A packet communication exchanging apparatus as claimed in claim 1, wherein a frequency of said dummy packet transmitted from said dummy packet generator/transmitter is controlled by a queue length of said data packets stored in said packet receiving buffer instead of controlling said contention parameter of said dummy packet by said queue length thereof.

4. A packet communication exchanging apparatus as claimed in claim 1, wherein both a frequency of said dummy packet transmitted from said dummy packet generator/transmitter and said contention parameter of said dummy packet are controlled in accordance with said queue length of said data packets stored in said packet receiving buffer.

5. A packet communication exchanging apparatus comprising:
   a common communication channel through which a plurality of data packets are communicated;
   a plurality of input module means coupled to said common communication channel for receiving said data packets and transferring said data packets to said communication channel; and
   a plurality of output module means coupled to said common communication channel for temporarily storing said data packets sent from said input module means via said communication channel, and for generating/sending a dummy packet to said communication channel when an amount of said data packets temporarily stored therein exceeds a predetermined threshold value;

each of said output module means including a packet receiving buffer for temporarily storing said data packets sent from said input module means via said communication channel;

a queue packet monitor unit for monitoring an amount of queue data packets temporarily stored in said packet receiving buffer so as to produce a contention control signal when said amount of said queue packets exceeds said threshold value;

dummy contention means for generating a dummy packet in response to said contention control signal and for transmitting said dummy packet to said communication channel;

contention monitoring means for monitoring a result of contention occurring on said common communication channel so as to output a contention result signal; and, packet transmitting means for transmitting a data packet to said common communication channel in response to said contention result signal, said contention result signal being supplied to said dummy contention means so as to control dummy packet transmission therefrom, whereby said input module means perform a contention control by employing contention parameters for said contention control effected among said input module means and said output module means, which own transmission requests, in order to transmit both said data packet and said dummy packet before transmitting said data packet to said common communication channel, said input module means which has obtained a transmission right as a result of the contention control, transmitting said data packet to said common communication channel. and said dummy contention means performing said dummy contention when said queue packet amount exceeds said threshold value.

6. A packet communication exchanging apparatus as claimed in claim 5, wherein said queue packet monitor unit includes:

a counter for counting a quantity of said queue data packets temporarily stored in said packet receiving buffer by receiving a packet reception signal and a packet transmission signal derived from said packet receiving buffer;

a reference memory for previously storing said threshold value; and a comparator for comparing a quantity of said queue data packets with said threshold value so as to output said contention control signal to said dummy contention means.

7. A packet communication exchanging apparatus as claimed in claim 5, wherein said dummy contention means controls a contention parameter of said dummy contention in response to a queue length of said data packets stored in said packet receiving buffer.

8. A packet communication exchanging apparatus as claimed in claim 5, wherein a frequency of a contention participation with said dummy contention is controlled in response to a queue length of said data packets stored in said packet receiving buffer, instead of controlling said contention parameters.

9. A packet communication exchanging apparatus as claimed in claim 5, wherein both said contention parameter of said dummy contention and a frequency of a contention participation with said dummy contention are controlled in response to a queue length of said data packets stored in said packet receiving buffer.

* * * * *